(12) United States Patent
Sonoda et al.

(10) Patent No.: US 9,331,618 B2
(45) Date of Patent: May 3, 2016

(54) MAGNETIC POLE POSITION DETECTOR FOR SYNCHRONOUS MOTOR

(71) Applicant: FANUC CORPORATION, Minamitsuru-gun, Tamanashi (JP)

(72) Inventors: Naoto Sonoda, Yamanashi (JP); Yukio Toyozawa, Yamanshi (JP)

(73) Assignee: Fanuc Corporation, Yamanashi (JP)

(*) Notice: Subject to any disclaimer, the term of this patent is extended or adjusted under 35 U.S.C. 154(b) by 117 days.

(21) Appl. No.: 14/089,111

(22) Filed: Nov. 25, 2013

(65) Prior Publication Data
US 2014/0152204 A1 Jun. 5, 2014

(30) Foreign Application Priority Data
Dec. 3, 2012 (JP) ................................. 2012-264603

(51) Int. Cl.
*H02P 21/00* (2006.01)
*H02P 6/06* (2006.01)
*H02P 6/00* (2006.01)

(52) U.S. Cl.
CPC ........ *H02P 21/0032* (2013.01); *H02P 21/0053* (2013.01); *H02P 2203/03* (2013.01); *H02P 2203/11* (2013.01)

(58) Field of Classification Search
CPC  H02P 21/146; H02P 2924/00; H02P 21/0035
See application file for complete search history.

(56) References Cited

U.S. PATENT DOCUMENTS

| | | | | |
|---|---|---|---|---|
| 6,445,154 | B1* | 9/2002 | Toyozawa | H02P 6/18 318/700 |
| 6,801,011 | B2* | 10/2004 | Ide | H02P 6/185 318/609 |
| 7,071,651 | B2* | 7/2006 | Toyozawa | H02P 6/002 318/801 |

(Continued)

FOREIGN PATENT DOCUMENTS

| DE | 10393429 | 9/2005 |
|---|---|---|
| DE | 112004002619 | 10/2006 |

(Continued)

*Primary Examiner* — Eduardo Colon Santana
*Assistant Examiner* — Charles S Laughlin
(74) *Attorney, Agent, or Firm* — RatnerPrestia

(57) ABSTRACT

A magnetic pole position detector includes, a voltage command unit that generates high-frequency voltage command in a dq coordinate system, a three-phase transformation unit that transforms the high-frequency voltage command in the dq coordinate system to high-frequency voltage command in a three-phase coordinate system by using an estimated magnetic pole position, a current detection unit that detects three-phase current fed from a power converter for generating drive power, a dq transformation unit that transforms the detected three-phase current to current in the dq coordinate system by using the estimated magnetic pole position, an estimated magnetic pole position calculation unit that calculates a new estimated magnetic pole position to be used in three-phase dq transformations, and a magnetic pole position confirmation unit that confirms that, when converging on a certain position, the estimated magnetic pole position is the magnetic pole position at the time when the synchronous motor is started.

3 Claims, 7 Drawing Sheets

(56) References Cited

U.S. PATENT DOCUMENTS

| | | | |
|---|---|---|---|
| 7,170,256 B2 * | 1/2007 | Iwashita | H02P 6/145 318/400.01 |
| 7,170,283 B2 * | 1/2007 | Toyozawa | H02P 1/46 318/700 |
| 7,514,896 B2 * | 4/2009 | Imura | H02P 6/182 318/400.2 |
| 8,207,694 B2 * | 6/2012 | Izumi | B60K 6/48 318/400.01 |
| 2004/0100220 A1 * | 5/2004 | Fu | B60L 15/00 318/700 |
| 2005/0110452 A1 | 5/2005 | Toyozawa et al. | |
| 2006/0049787 A1 | 3/2006 | Ide | |
| 2011/0062902 A1 | 3/2011 | Patel | |

FOREIGN PATENT DOCUMENTS

| | | |
|---|---|---|
| DE | 102010040393 | 4/2011 |
| EP | 1085650 | 3/2001 |
| JP | 2002-136174 | 5/2002 |
| JP | 3408468 | 3/2003 |
| JP | 3805336 | 5/2006 |
| JP | 2012-044751 A | 3/2012 |

\* cited by examiner

MAGNETIC POLE POSITION DETECTOR FOR SYNCHRONOUS MOTOR

BACKGROUND OF THE INVENTION

1. Field of the Invention

The present invention relates to a magnetic pole position detector for detecting a magnetic pole position of a synchronous motor when the synchronous motor is started.

2. Description of the Related Art

In synchronous motors including a permanent magnet, a current needs to be fed to the windings of each phase according to the magnetic pole position of the rotor, to produce desired torque. To enable this, the permanent-magnet synchronous motors are controlled so as to feed current to a proper excitation phase (magnetic pole position) by detecting the magnetic pole position of the rotor with a sensor such as an encoder. FIG. 7A and FIG. 7B are schematic diagrams that illustrate detection of a magnetic pole position of a permanent-magnet synchronous motor. A synchronous motor 100 illustrated in FIG. 7A includes a permanent magnet 101 on a rotor, and armature windings 102U, 102V, and 102W on a stator. Note that FIG. 7A does not specifically illustrate the number of times or the way in which the wire of each armature winding is wound, but illustrates a typical example of a permanent-magnet synchronous motor using windings for producing a three-phase rotating magnetic field, the phases being a U phase, a V phase, and a W phase, for example. In addition, FIG. 7A does not specifically illustrate the shape or the arrangement of the permanent magnet, but simply illustrates the permanent magnet as one having the N-pole and the S-pole. When the rotor is in the position illustrated in FIG. 7A, the rotor is drawn on a dq coordinate plane as illustrated in FIG. 7B. For example, assume that a magnetic pole of the rotor 101 of the synchronous motor 100 is at the position illustrated in FIG. 7B (referred to as an "initial magnetic pole position" hereinafter), i.e., the position shifted by the angle δ from the d-axis, when the synchronous motor 100 is started. In this case, data detected by a sensor is corrected on the basis of the initial magnetic pole position, and the rotation of the rotor is controlled by controlling the current phase (excitation phase) of each of the armature windings 102U, 102V, and 102W on the basis of the corrected data.

When the initial magnetic pole position used for correcting data detected by the sensor is inaccurate, the rotation of the synchronous motor is controlled by using the inaccurate data. This often leads to variations in torque constant when the synchronous motor is driven, and of not being able to produce the maximum torque. Especially when the synchronous motor is rotated at such a high speed that weak field control is needed, it is difficult to feed a proper d-phase current when the initial magnetic pole position is inaccurate. This causes a lack of drive voltage to be applied to the synchronous motor, and consequently makes the control of the synchronous motor unstable. For these reasons, to control a synchronous motor, it is important to accurately detect the initial magnetic pole position when the synchronous motor is started. To obtain an accurate initial magnetic pole position, a sensor capable of detecting a magnetic pole position as an absolute value is used in some cases. In such a case, the sensor is sometimes aligned with the magnetic pole position when being mounted. Alternatively, to omit the alignment operation, a motor controller carries out a magnetic pole position detection process when the synchronous motor is started, for example.

Various methods of detecting a magnetic pole position have been proposed. For example, Japanese Patent No. 3408468 proposes a method of detecting a magnetic pole position by feeding a current to a predetermined excitation phase of a stator in a short period of time and repeating feeding of a current to a different excitation phase in a short period of time on the basis of the direction in which the rotor rotated at the previous current feeding.

Moreover, Japanese Patent No. 3805336 proposes a method of detecting a magnetic pole position in a synchronous motor having saliency by observing current feedbacks while changing an excitation phase by inputting a high-frequency voltage command.

Furthermore, Japanese Laid-open Patent Application Publication No. 2002-136174 proposes a method of performing sensorless rotation control on a synchronous motor when the synchronous motor is in steady operation, although this method is not only applicable to detection of a magnetic pole position at the time when the synchronous motor is started. According to the method described in Japanese Laid-open Patent Application Publication No. 2002-136174, the sensorless control is made possible by causing the phase of each voltage command to conform to the phase of the corresponding counter electromotive voltage induced in the synchronous motor, by using a phase locked loop (PLL) circuit.

According to the method described in above Japanese Patent No. 3408468, the rotor needs to be rotated minutely. Consequently, the accuracy in detecting the initial magnetic pole position is affected by the friction and inertia of the rotor. Therefore, in some cases, it is difficult to detect the position when the rotor is locked.

Moreover, according to the method described in above Japanese Patent No. 3805336, the value of each high-frequency voltage command to be input needs to be adjusted according to the degree of saliency of the synchronous motor. Accordingly, when the saliency is low, the accuracy in detecting an initial magnetic pole position is poor. In addition, filtering is performed by differentiating current feedbacks, and a magnetic pole position is detected on the basis of the magnitudes of the amplitudes. For this reason, detection using this method is likely to be affected by noise.

Further, the method described in above Japanese Laid-open Patent Application Publication No. 2002-136174 uses counter electromotive voltage. Accordingly, the rotor of the synchronous motor needs to be rotated. For this reason, when this method is employed to detect an initial magnetic pole position, the accuracy in detecting an initial magnetic pole position is affected by the friction and inertia of the rotor, as in the case of Japanese Patent No. 3408468 described above. As a result, it is difficult to detect the position when the rotor is locked, for example.

SUMMARY OF THE INVENTION

In view of the above-described problems, an object of the present invention is to provide a magnetic pole position detector that is capable of detecting a magnetic pole position with high accuracy at the time when a synchronous motor is started, and that is unlikely to be affected by noise.

To achieve the above-described object, a magnetic pole position detector for detecting a magnetic pole position at a time when a synchronous motor is started, the detector includes: a voltage command unit that generates high-frequency voltage command in a dq coordinate system; a three-phase coordinate transformation unit that transforms the high-frequency voltage command in the dq coordinate system to a high-frequency voltage command in a three-phase coordinate system by using an estimated magnetic pole position; a current detection unit that detects three-phase current fed from a power converter to the synchronous motor, the power converter generating drive power for the synchronous motor in accordance with the high-frequency-voltage command in the three-phase coordinate system; a dq-coordinate transformation unit that transforms the three-phase current detected by the current detection unit to current in the dq coordinate system by using the estimated magnetic pole position used in a transformation by the three-phase coordinate transformation unit; an estimated magnetic pole position calculation unit that calculates a new estimated magnetic pole position to be used in a coordinate transformation process by each of the three-phase coordinate transformation unit and the dq-coordinate transformation unit, in accordance with the current in the dq coordinate system and the high-frequency voltage command in the dq coordinate system; and a magnetic pole position confirmation unit that confirms that, when the estimated magnetic pole position calculated by the estimated magnetic pole position calculation unit substantially converges on a certain position, the estimated magnetic pole position is the magnetic pole position at the time when the synchronous motor is started.

It is preferable that the high-frequency voltage command in the dq coordinate system includes a d-phase component that is a high frequency and a q-phase component that has zero amplitude, and the estimated magnetic pole position calculation unit calculate the new estimated magnetic pole position to be used, on the basis of a q-phase component of the current in the dq coordinate system and the d-phase component that is a high frequency.

The estimated magnetic pole position calculation unit may include: a differentiation unit that differentiates a value of the current in the dq coordinate system; a product calculation unit that calculates a product of the value of current differentiated by the differentiation unit and the high-frequency voltage command in the dq coordinate system; a filtering unit that removes a high-frequency component from the product obtained by the product calculation unit; a gain unit that calculates a product of a predetermined gain constant and a signal output by the filtering unit after the removal of the high-frequency component; and an integration unit that integrates the product output from the gain unit and then outputs an integrated result as a new estimated magnetic pole position to be used.

The estimated magnetic pole position calculation unit may include: a phase shifting unit that shift a phase of the high-frequency voltage command in the dq coordinate system; a product calculation unit that calculates a product of a value of the current in the dq coordinate system and the high-frequency voltage command whose phase is shifted by the phase shifting unit; a filtering unit that removes a high-frequency component from the product obtained by the product calculation unit; a gain unit that calculates a product of a predetermined gain constant and a signal output by the filtering unit after the removal of the high-frequency component; and an integration unit that integrates the product output from the gain unit and then outputs an integrated result as a new estimated magnetic pole position to be used.

BRIEF DESCRIPTION OF THE DRAWINGS

The present invention can be understood more clearly by referring to the accompanying drawings described below.

DESCRIPTION OF THE PREFERRED EMBODIMENTS

Figure 1:
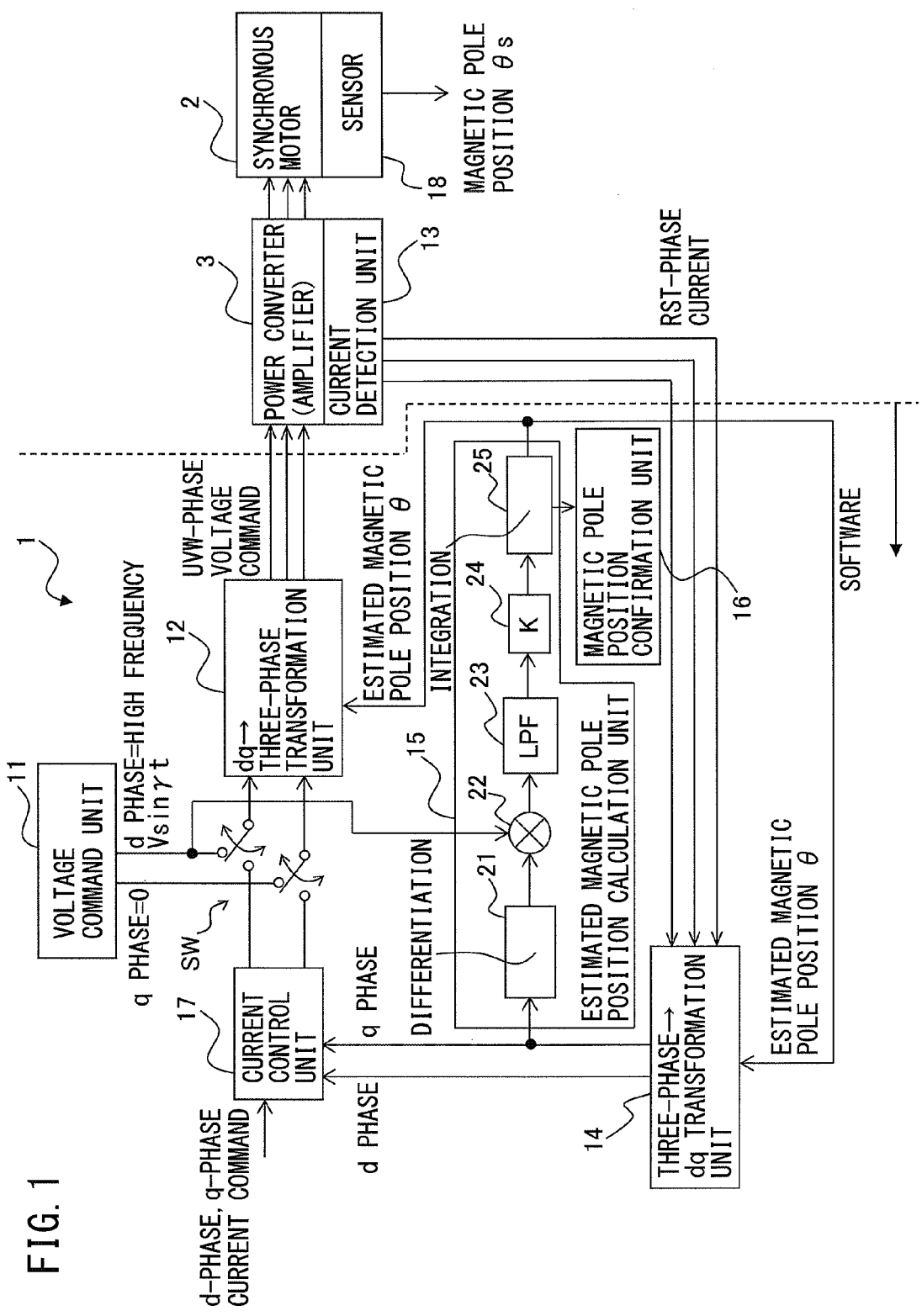
FIG. 1 is a block diagram illustrating a principle of a magnetic pole position detector according to a first embodiment.

A magnetic pole position detector for a synchronous motor will be described below with reference to the drawings. However, it is to be understood that the present invention is not limited to those illustrated in the drawings or the embodiments described below.

FIG. 1 is a block diagram illustrating a principle of a magnetic pole position detector according to a first embodiment. In the following, it is intended that constituent elements denoted by the same reference numerals and characters in different drawings have the same functions.

A magnetic pole position detector 1 according to the first embodiment detects an initial magnetic pole position at the time when a permanent-magnet synchronous motor 2 is started, and is provided in a motor controller (not illustrated) that controls rotation of the synchronous motor 2. However, the magnetic pole position detector 1 may be implemented as a separate device to enable post-attachment to an existing motor controller. The magnetic pole position detector 1 detects an initial magnetic pole position (initial excitation phase) of a rotor of the synchronous motor 2 before rotation control is performed on the synchronous motor 2, i.e., when the synchronous motor 2 is started. To perform rotation control of the synchronous motor 2, a switch SW illustrated in FIG. 1 is operated to disconnect a current control unit 17 and a three-phase coordinate transformation unit 12. In this case, the current control unit 17 generates a d-phase voltage command and a q-phase voltage command for controlling a power converter (amplifier) 3 to output drive power to achieve desired rotation speed and torque of the synchronous motor 2. These commands are generated on the basis of an input d-phase current command and q-phase current command, the value of current obtained by performing dq coordinate transformation on three-phase current fed from the power converter 3 to the synchronous motor 2 and detected by a current detection unit 13, and a magnetic pole position $\theta s$ of the rotor of the synchronous motor 2 detected by the magnetic pole position $\theta s$ being detected by a sensor 18. In this process carried out by the current control unit 17, the magnetic pole position $\theta s$, of the rotor of the synchronous motor 2, detected by the sensor 18 is obtained by correcting data by using an initial magnetic pole position detected by the magnetic pole position detector 1. Accordingly, rotation of the synchronous motor 2 is controlled on the basis of the magnetic pole position data thus corrected. The d-phase voltage command and the q-phase voltage command generated by the current control unit 17 are coordinate-transformed to a UVW three-phase voltage command by a three-phase coordinate transformation unit 12, and the transformed voltage command are then input to the power converter 3. The power converter 3 is a three-phase inverter, which converts a direct current to three-phase alternating current, for example. The power converter 3 converts an input direct current to three-phase alternating current that is to serve as drive power for the synchronous motor 2, by controlling the switching operation of switching elements (not illustrated) on the basis of the input three-phase voltage command.

As described above, to perform rotation control on the synchronous motor 2 when the synchronous motor 2 is in steady operation, the switch SW is selected to disconnect the current control unit 17 and the three-phase coordinate transformation unit 12. By contrast, when the magnetic pole position detector 1 is to operate to detect the initial magnetic pole position at the time when the synchronous motor 2 is started, the switch SW illustrated in FIG. 1 is selected to disconnect a voltage command unit 11 and the three-phase coordinate transformation unit 12.

The magnetic pole position detector 1 detects the initial magnetic pole position at the time when the synchronous motor 2 is started, by use of the saliency of the permanent-magnet synchronous motor 2 and the principle of a phase locked loop (PLL). The configuration of the magnetic pole position detector 1 will be described below.

The magnetic pole position detector 1 according to the first embodiment includes the voltage command unit 11, the three-phase coordinate transformation unit 12, the current detection unit 13, a dq-coordinate transformation unit 14, an estimated magnetic pole position calculation unit 15, and a magnetic pole position confirmation unit 16. The voltage command unit 11, the three-phase coordinate transformation unit 12, the current detection unit 13, the dq-coordinate transformation unit 14, the estimated magnetic pole position calculation unit 15, and the magnetic pole position confirmation unit 16 are implemented in the form of software in an arithmetic processing unit in the motor controller (not illustrated). However, when the magnetic pole position detector 1 is implemented as a separate device, these units are implemented in the form of software in an arithmetic processing unit in the magnetic pole position detector 1.

The voltage command unit 11 generates a high-frequency voltage command in the dq coordinate system. The high-frequency voltage command in the dq coordinate system includes a d-phase component that is a high frequency and a q-phase component that has zero amplitude.

The three-phase coordinate transformation unit 12 transforms the high-frequency voltage command in the dq coordinate system to a high-frequency voltage command in the three-phase coordinate system by using an estimated magnetic pole position (estimated excitation phase).

The current detection unit 13 detects three-phase current fed from the power converter 3 for generating drive power for the synchronous motor 2, to the synchronous motor 2, in accordance with the high-frequency voltage command in the three-phase coordinate system.

The dq-coordinate transformation unit 14 transforms the three-phase current detected by the current detection unit 13, to a current in the dq coordinate system, by using the estimated magnetic pole position used in the transformation by the three-phase coordinate transformation unit 12.

The estimated magnetic pole position calculation unit 15 calculates a new estimated magnetic pole position to be used in the coordinate transformation processes by the three-phase coordinate transformation unit 12 and the dq-coordinate transformation unit 14, on the basis of a current in the dq coordinate system and a high-frequency voltage command in the dq coordinate system. As described above, the voltage command unit 11 generates the high-frequency voltage command in the dq coordinate system including a d-phase component that is a high frequency and a q-phase component that has zero amplitude. Then the estimated magnetic pole position calculation unit 15 calculates a new estimated magnetic pole position to be used, on the basis of the q-phase component of the current in the dq coordinate system and the d-phase component that is a high frequency.

In the first embodiment, the estimated magnetic pole position calculation unit 15 includes a differentiation unit 21, a product calculation unit 22, a filtering unit 23, a gain unit 24, and an integration unit 25. The differentiation unit 21 differentiates the value of the current in the dq coordinate system calculated by the dq-coordinate transformation unit 14. The product calculation unit 22 calculates the product of the current value differentiated by the differentiation unit 21 and the high-frequency voltage command in the dq coordinate system. The filtering unit 23 is a low-pass filter (LPF) that removes a high-frequency component from the result of the calculation by the product calculation unit 22. The gain unit 24 calculates the product of a predetermined gain constant and a signal output by the filtering unit 23 after the removal of the high-frequency component. The integration unit 25 integrates the result output by the gain unit 24, and then outputs the integral as a new estimated magnetic pole position to be used.

When the estimated magnetic pole position calculated by the estimated magnetic pole position calculation unit 15 substantially converges on a certain position, the magnetic pole position confirmation unit 16 confirms that the estimated magnetic pole position is the magnetic pole position when the synchronous motor 2 is started.

The magnetic pole position detector 1 detects the magnetic pole position at the time when the synchronous motor 2 is started, by use of the saliency of the permanent-magnet synchronous motor 2 and the principle of the PLL. In the following, an operation principle of the magnetic pole position detector 1 according to the first embodiment will be described.

Figure 2:
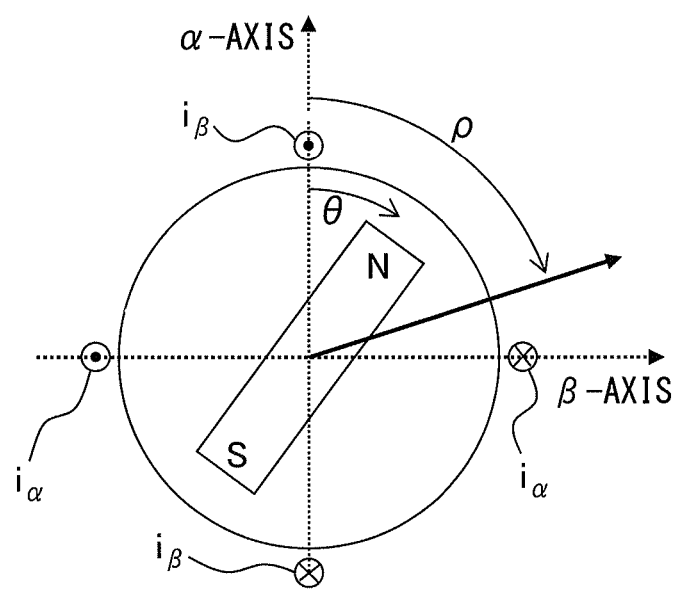
FIG. 2 is a diagram illustrating the relationship between the actual position of a rotor in $\alpha\beta$ coordinates and a position of the rotor detected by a sensor mounted on a synchronous motor.

FIG. 2 is a diagram illustrating the relationship between the actual position of the rotor and a position of the rotor detected by the sensor mounted on the synchronous motor, in $\alpha\beta$ coordinate system. Consider that the rotor is in a position shifted by $\theta$ from the $\alpha$-axis at some point in time, in the $\alpha\beta$ coordinate system, which is a rotating coordinate system, as illustrated in FIG. 2, while a detection result obtained by the sensor 18 indicates that the rotor is in the position shifted by $\rho$ from the $\alpha$-axis. In other words, consider a case of having a difference represented by "$\rho-\theta$" between the actual rotor position $\theta$ and the rotor position $\rho$ obtained by the sensor 18.

Assume that respective components of current fed to the rotor having the saliency corresponding to two-phase windings in $\alpha\beta$ coordinate system are denoted by $i_\alpha$ and $i_\beta$, magnetic fluxes to occur are denoted by $\lambda_\alpha$ and $\lambda_\beta$, the inductance on the d-axis is denoted by $L_d$, the inductance on the q-axis is denoted by $L_q$, the direct current and the ripple current of each of the inductances $L_d$ and $L_q$ are denoted by $L_0$ and $L_2$, respectively, and the magnetic flux of the permanent magnet is denoted by $\phi$. In this case, the actual rotor position $\theta$ in the $\alpha\beta$ coordinate system, which is a rotating coordinate system, is represented by Equation (1):

$$\lambda_\alpha = (L_0 + L_2 \cdot \cos 2\theta) \cdot \sin 2\theta \cdot i_\beta + \phi \cdot \cos \theta$$

$$\lambda_\beta L_2 \cdot \sin 2\theta \cdot i_\alpha + (L_0 - L_2 \cdot \cos 2\theta) \cdot i_\beta + \phi \cdot \sin \theta \quad (1)$$

where $L_d = L_0 + L_2$
$L_q = L_0 - L_2$
$L_q > L_d$

Equation (2) represents a case of substituting "ρ−θ", which is the difference between the actual rotor position and the rotor position detected by the sensor 18, for θ in Equation (1), and then performing dq-coordinate transformation on the substitution result.

$$\lambda_d = (L_0 + L_2 \cos 2(\rho-\theta)) \cdot i_d - L_2 \sin 2(\rho-\theta) \cdot i_q + \phi \cos(\rho-\theta)$$

$$\lambda_q = -L_2 \sin 2(\rho-\theta) \cdot i_d + (L_0 - L_2 \cos 2(\rho-\theta)) \cdot i_q - \phi \sin(\rho-\theta) \quad (2)$$

By transforming Equation (2) to an equation for voltages $v_d$ and $v_q$ on the dq-coordinate axes, Equation (3) is obtained:

$$\begin{bmatrix} v_d \\ v_q \end{bmatrix} = \begin{bmatrix} Rs + pL_{dc} + \omega L_{dqc} & -pL_{dqc} - \omega L_{qc} \\ -pL_{dqc} + \omega L_{dc} & Rs + pL_{qc} - \omega L_{dqc} \end{bmatrix} \begin{bmatrix} i_d \\ i_q \end{bmatrix} + \omega\phi \begin{bmatrix} \sin(\rho-\theta) \\ \cos(\rho-\theta) \end{bmatrix} \quad (3)$$

where $L_{dc} = L_0 + L_2 \cos 2(\rho-\theta)$
$L_{qc} = L_0 - L_2 \cos 2(\rho-\theta)$
$L_{dqc} = L_2 \sin 2(\rho-\theta)$
$p = d/dt$ Equation (4) is obtained by differentiating Equation (3) to transform Equation (3) to an equation for current. In Equation (4), the rotation speed of the rotor is denoted by ω.

$$p\begin{bmatrix} i_d \\ i_q \end{bmatrix} = \frac{1}{L_d \cdot L_q} \begin{bmatrix} L_{qc} & L_{dqc} \\ L_{dqc} & L_{dc} \end{bmatrix} \left\{ \begin{bmatrix} V_d \\ V_q \end{bmatrix} - \begin{bmatrix} Rs + \omega L_{dqc} & -\omega L_{dc} \\ \omega L_{dc} & Rs - \omega L_{dqc} \end{bmatrix} \begin{bmatrix} i_d \\ i_q \end{bmatrix} - \omega\phi \begin{bmatrix} \sin(\rho-\theta) \\ \cos(\rho-\theta) \end{bmatrix} \right\} \quad (4)$$

As described above, the voltage command unit 11 generates the voltage command including a d-phase component that is high-frequency $v_{dh} = V \sin \gamma t$ and a q-phase component that has zero amplitude. By substituting the voltage command into Equation (4), Equation (5) is obtained, assuming that the second term on the right-hand side of Equation (4) can be ignored since this does not affect high frequencies, and that ω=0 since the rotor is standing still when the synchronous motor 2 is started:

$$p\begin{bmatrix} i_d \\ i_q \end{bmatrix} = \frac{1}{L_d \cdot L_q} \begin{bmatrix} L_{qc} & L_{dqc} \\ L_{dqc} & L_{dc} \end{bmatrix} \begin{bmatrix} V \sin \gamma t \\ 0 \end{bmatrix} \quad (5)$$

When the power converter 3 is caused to operate in accordance with the high-frequency voltage command in the dq coordinate system generated by the voltage command unit 11, the current detection unit 13 detects three-phase current. The dq-coordinate transformation unit 14 transforms the detected three-phase current to a current in the dq coordinate system. The value obtained by the differentiation unit 21 in the estimated magnetic pole position calculation unit 15 by differentiating the current corresponding to the q-phase component of the obtained current, corresponds to $pi_q$ in Equation (5). The product calculation unit 22 in the estimated magnetic pole position calculation unit 15 calculates the product of $i_q$ in $pi_q$ in Equation (5) obtained by the differentiation unit 21 and the d-phase component $v_{dh} = V \sin \gamma t$ in the high-frequency voltage command in the dq-coordinate system. Then the filtering unit 23 in the estimated magnetic pole position calculation unit 15 removes $\cos 2\gamma t$ corresponding to a high-frequency carrier, from the product. Thereby, components presented in Equation (6) are extracted:

$$pi_q \cdot v_{dh} = \frac{1}{L_d \cdot L_q} L_2 \sin 2(\rho-\theta) \cdot V^2 \cdot (\sin \gamma t)^2 \rightarrow pi_q \cdot v_{dh} = \frac{V^2}{2 \cdot L_d \cdot L_q} L_2 \sin 2(\rho-\theta) \cdot (1 - \cos 2\gamma t) \rightarrow f_q = pi_q \cdot v_{dh} = \frac{V^2}{4 \cdot L_d \cdot L_q} (L_d - L_q) \cdot \sin 2(\rho-\theta) \quad (6)$$

As can be understood from Equation (6), the component "ρ−θ", which is the phase difference between the actual rotor position θ and the rotor position ρ detected by the sensor 18, is included. In the first embodiment, assume that ρ in Equations (1) to (6) denotes an estimated magnetic pole position. The value obtained by multiplying the phase difference based on Equation (6) by the predetermined gain according to the gain unit 24 and then integrating the obtained value by the integration unit 25, is set as a new estimated magnetic pole position. This new position is used in coordinate transformation processes to be carried out by the three-phase coordinate transformation unit 12 and the dq-coordinate transformation unit 14. Choosing an appropriate gain to be used by the gain unit 24 enables the integral output by the integration unit 25 to converge on a constant value at a certain time constant. Accordingly, the magnetic pole position confirmation unit 16 confirms that the estimated magnetic pole position output by the integration unit 25 of the estimated magnetic pole position calculation unit 15 when the estimated magnetic pole position substantially converges on a certain position is the initial magnetic pole position at the time when the synchronous motor 2 is started.

In general, there are two types of rotor structures for a synchronous motor: a surface magnet type having a permanent magnet attached to the rotor surface; and an embedded magnet type having a permanent magnet embedded in the rotor. The magnetic pole position detector 1, which uses the saliency of the synchronous motor 2, is suitable for detection of the magnetic pole position at the time when an embedded-magnet-type rotor having high saliency is started. At the same time, even in the case of a surface-magnet-type rotor having low saliency, the magnetic pole position detector 1 is capable of detecting an initial magnetic pole position with high accuracy, by appropriately choosing the gain constant to be used by the gain unit 24.

Figure 3:
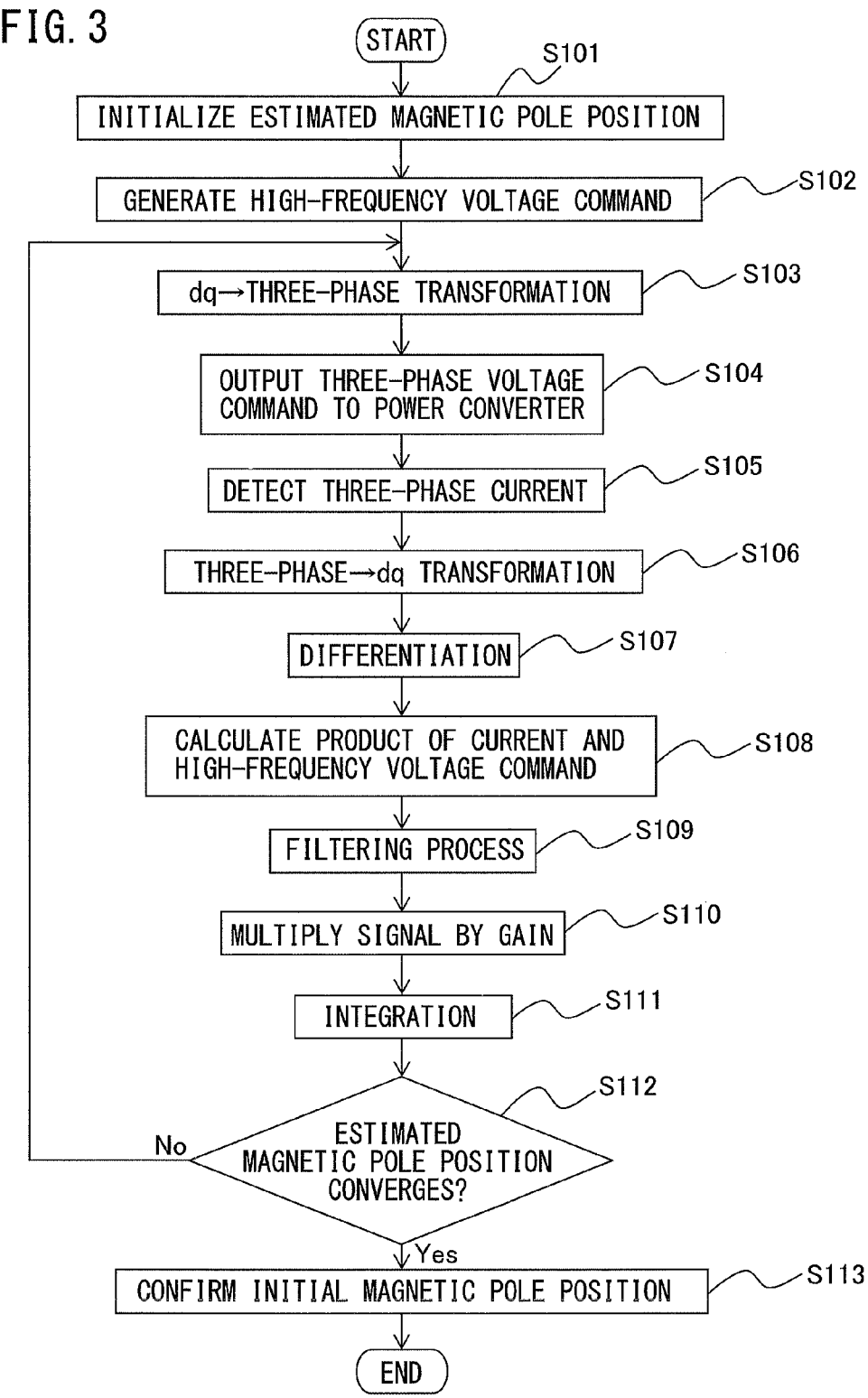
FIG. 3 is a flowchart illustrating an operation flow of the magnetic pole position detector according to the first embodiment.

FIG. 3 is a flowchart illustrating an operation flow of the magnetic pole position detector according to the first embodiment.

First, in Step S101, an estimated magnetic pole position to be used in the coordinate transformations by the three-phase coordinate transformation unit 12 and the dq-coordinate transformation unit 14 is initialized.

In Step S102, the voltage command unit 11 generates high-frequency voltage command in the dq coordinate system. The high-frequency voltage command in the dq coordinate system includes a d-phase component that is a high frequency and a q-phase component that has zero amplitude.

Then, in Step S103, the three-phase coordinate transformation unit 12 transforms the high-frequency voltage command in the dq coordinate system to a high-frequency voltage command in the three-phase coordinate system by using the estimated magnetic pole position.

In Step S104, the high-frequency voltage command in the three-phase coordinate system obtained through the transformation is output to the power converter 3. Thereby, the power converter 3 outputs a three-phase alternating-current power in accordance with the received high-frequency voltage command.

In Step S105, the current detection unit 13 detects three-phase current fed from the power converter 3, which generates drive power for the synchronous motor 2 in accordance with the high-frequency voltage command in the three-phase coordinate system, to the synchronous motor 2.

Thereafter, in Step S106, the dq-coordinate transformation unit 14 transforms the three-phase current detected by the current detection unit 13, to a current in the dq coordinate system by using the estimated magnetic pole position used in the transformation by the three-phase coordinate transformation unit 12.

Then, in Step S107, the differentiation unit 21 of the estimated magnetic pole position calculation unit 15 differentiates the value of the current in the dq coordinate system calculated by the dq-coordinate transformation unit 14.

Then, in Step S108, the product calculation unit 22 of the estimated magnetic pole position calculation unit 15 calculates the product of the current value differentiated by the differentiation unit 21 and the high-frequency voltage command in the dq coordinate system.

Then, in Step S109, the filtering unit 23 of the estimated magnetic pole position calculation unit 15 removes a high-frequency component from the calculation result obtained by the product calculation unit 22.

Then, in Step S110, the gain unit 24 of the estimated magnetic pole position calculation unit 15 calculates the product of a predetermined gain constant and the signal output by the filtering unit 23 after the removal of the high-frequency component.

Then, in Step S111, the integration unit 25 of the estimated magnetic pole position calculation unit 15 integrates the result output by the gain unit 24, and then outputs the integral as a new estimated magnetic pole position to be used.

Then, in Step S112, the magnetic pole position confirmation unit 16 determines whether or not the estimated magnetic pole position calculated by the estimated magnetic pole position calculation unit 15 substantially converges on a certain position. When it is determined that the estimated magnetic pole position substantially converges on the certain position, the process goes to Step S113 in which the magnetic pole position confirmation unit 16 confirms that this estimated magnetic pole position is the initial magnetic pole position at the time when the synchronous motor 2 is started. As a modified example of this operation, the magnetic pole position confirmation unit 16 may determine whether a predetermined time period has elapsed (Step S112), and, when it is determined that the predetermined time period has elapsed, confirm that the estimated magnetic pole position is the magnetic pole position at the time when the synchronous motor 2 is started (Step S113).

Figure 4:
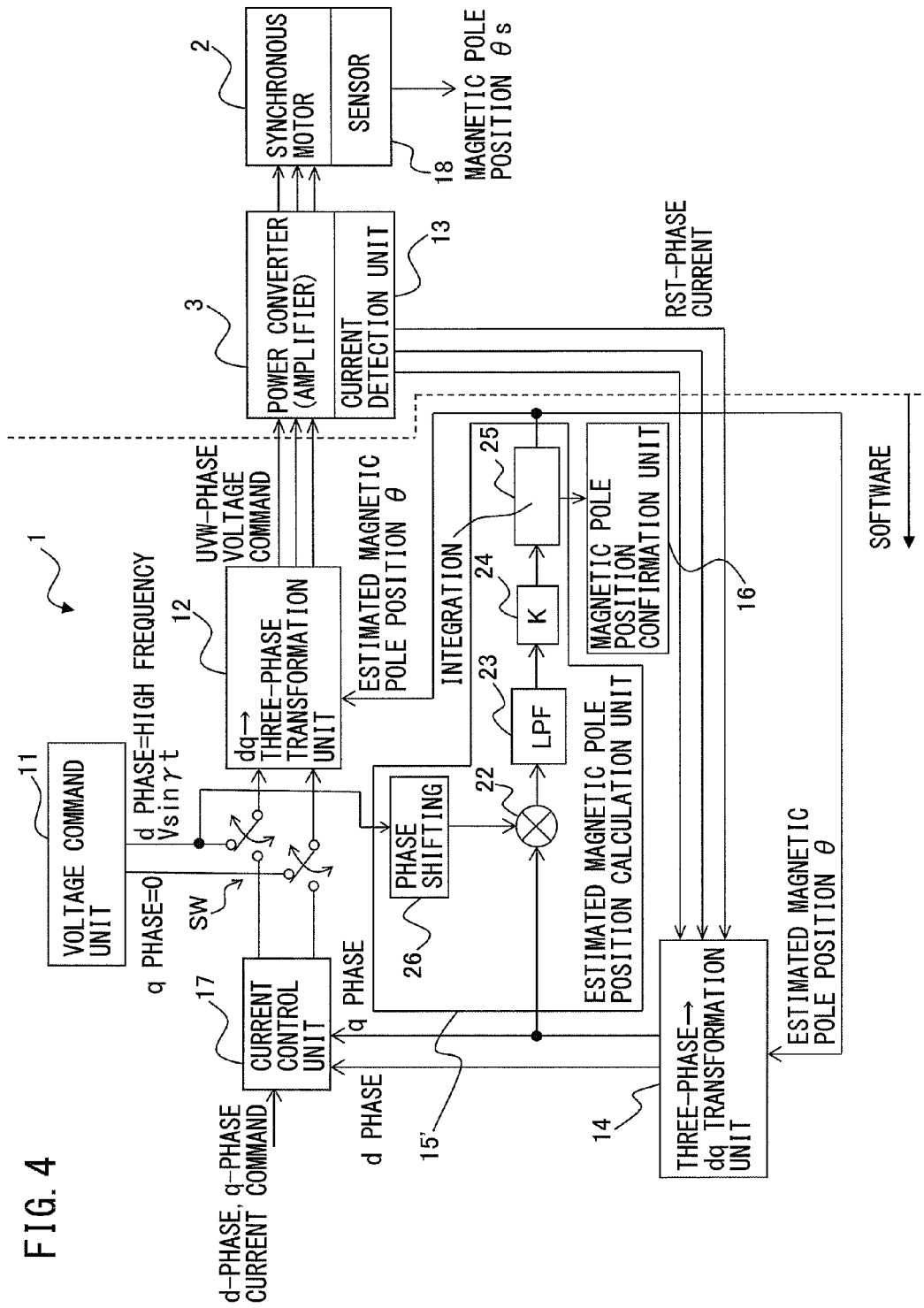
FIG. 4 is a block diagram illustrating a principle of a magnetic pole position detector according to a second embodiment.

FIG. 4 is a block diagram illustrating a principle of a magnetic pole position detector according to a second embodiment. The second embodiment provides an alternative example of the estimated magnetic pole position calculation unit 15 explained in the first embodiment. The circuit constituent elements other than an estimated magnetic pole position calculation unit 15' are the same as those in the first embodiment illustrated in FIG. 1, and are hence denoted by the same reference numerals and characters while detailed description of these constituent elements is omitted here. In the second embodiment, as in the first embodiment, the voltage command unit 11, the three-phase coordinate transformation unit 12, the current detection unit 13, the dq-coordinate transformation unit 14, the estimated magnetic pole position calculation unit 15', and the magnetic pole position confirmation unit 16 are implemented in the form of software in the arithmetic processing unit in the motor controller (not illustrated).

According to the second embodiment, the estimated magnetic pole position calculation unit 15' includes a phase shifting unit 26, the product calculation unit 22, the filtering unit 23, the gain unit 24, and the integration unit 25.

The phase shifting unit 26 shifts the phase of the high-frequency voltage command in the dq coordinate system generated by the voltage command unit 11. The product calculation unit 22 calculates the product of the value of a current in the dq coordinate system calculated by the dq-coordinate transformation unit 14 and the high-frequency voltage command whose phase is shifted by the phase shifting unit 26. The filtering unit 23 is an LPF that removes a high-frequency component from the calculation result obtained by the product calculation unit 22. The gain unit 24 calculates the product of a predetermined gain constant and a signal output by the filtering unit 23 after the removal of the high-frequency component. The integration unit 25 integrates the result output by the gain unit 24, and then outputs the integral as a new estimated magnetic pole position to be used.

Next, an operation principle of the magnetic pole position detector 1 according to the second embodiment will be described. By deforming the q-phase current $i_q$ of $pi_q$ expressed by Equation (5) given above, Equation (7) is obtained:

$$i_q = \frac{-L_{dqc}}{L_d \cdot L_q} V \cos \gamma t \tag{7}$$

By phase-shifting the d-phase component $v_{dh} = V \sin \gamma t$ generated as a high-frequency voltage command by the voltage command unit 11, by $\pi/2$ with the phase shifting unit 26 of the estimated magnetic pole position calculation unit 15', Equation (8) is obtained:

$$V_{dh}' = V \cos \gamma t \tag{8}$$

The product calculation unit 22 of the estimated magnetic pole position calculation unit 15' calculates the product of the $i_q$ expressed by the Equation (7) and $V \cos \gamma t$ expressed by Equation (8), and thereafter, the filtering unit 23 of the estimated magnetic pole position calculation unit 15' removes $\cos 2\gamma t$ corresponding to a high-frequency carrier, from the calculation result. Thereby, the components presented in Equation (9) are extracted:

$$i_q \cdot v_{dh} = \frac{-1}{L_d \cdot L_q} L_2 \sin 2(\rho - \theta) \cdot V^2 \cdot (\cos \gamma t)^2 \to i_q \cdot v_{dh} = \tag{9}$$

$$\frac{-V^2}{2 \cdot L_d \cdot L_q} L_2 \sin 2(\rho - \theta) \cdot (1 + \cos 2\gamma t) \to f_q =$$

$$i_q \cdot v_{dh} = \frac{-V^2}{4 \cdot L_d \cdot L_q} (L_d - L_q) \cdot \sin 2(\rho - \theta)$$

In Equation (9), although the positive/negative polarity is different from that in Equation (6) in the first embodiment, the absolute value is the same.

Accordingly, the same effect as in the first embodiment can be obtained in the second embodiment.

Figure 5:
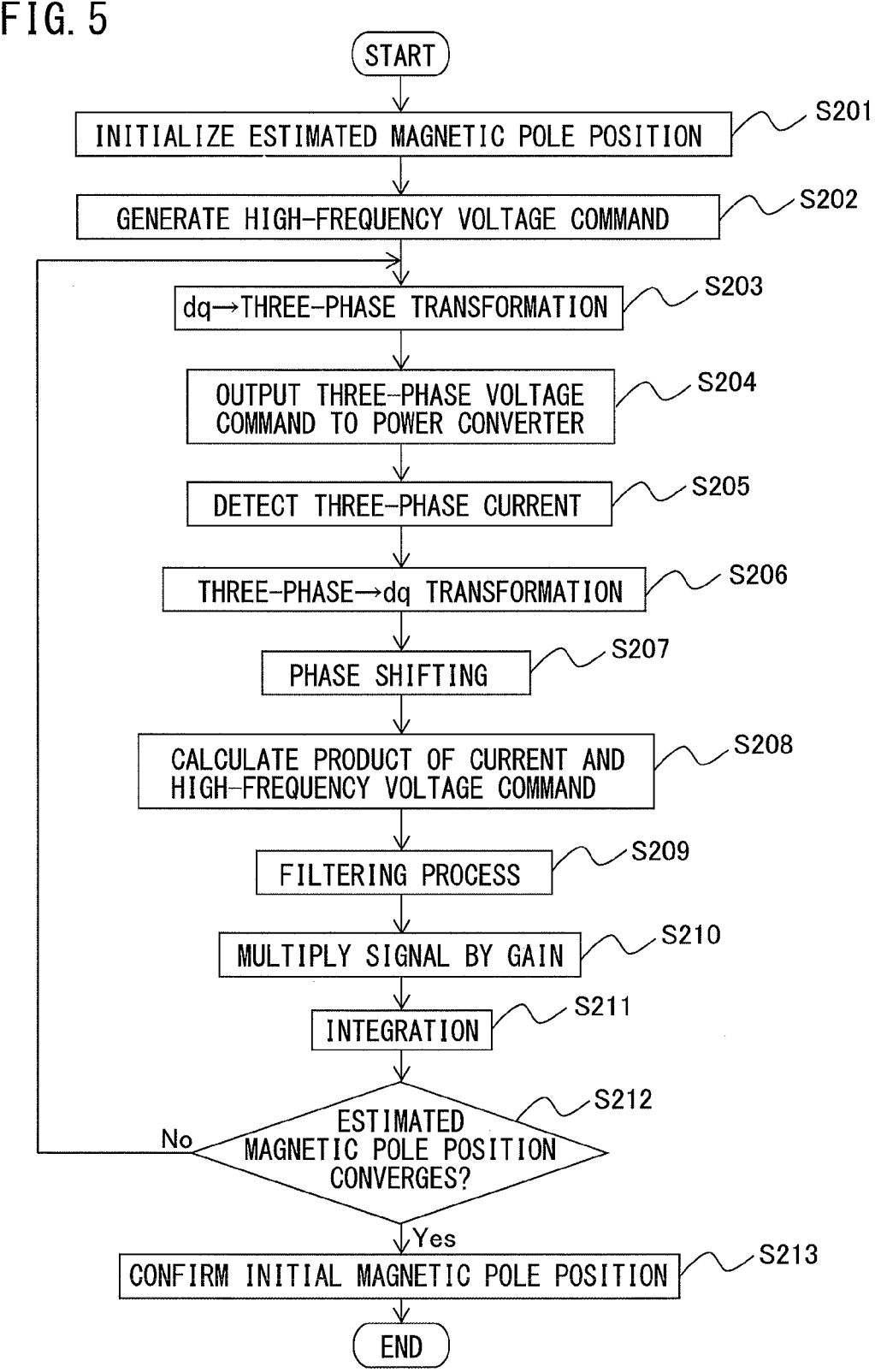
FIG. 5 is a flowchart illustrating an operation flow of the magnetic pole position detector according to the second embodiment.

FIG. 5 is a flowchart illustrating an operation flow of the magnetic pole position detector according to the second embodiment.

First, in Step S201, an estimated magnetic pole position to be used in the coordinate transformations by the three-phase coordinate transformation unit 12 and the dq-coordinate transformation unit 14 is initialized.

In Step S202, the voltage command unit 11 generates a high-frequency voltage command in the dq coordinate system. The high-frequency voltage command in the dq coordinate system includes a d-phase component that is a high frequency and a q-phase component that has zero amplitude.

Then, in Step S203, the three-phase coordinate transformation unit 12 transforms the high-frequency voltage command in the dq coordinate system to high-frequency voltage command in the three-phase coordinate system by using the estimated magnetic pole position.

In Step S204, the high-frequency voltage command in the three-phase coordinate system obtained through the transformation is output to the power converter 3. In accordance with the output high-frequency voltage command, the power converter 3 outputs a power.

In Step S205, the current detection unit 13 detects three-phase current fed from the power converter 3, which generates drive power for the synchronous motor 2 in accordance with the high-frequency voltage command in the three-phase coordinate system, to the synchronous motor 2.

Thereafter, in Step S206, the dq-coordinate transformation unit 14 transforms the three-phase current detected by the current detection unit 13, to a current in the dq coordinate system by using the estimated magnetic pole position used in the transformation by the three-phase coordinate transformation unit 12.

Then, in Step S207, the phase shifting unit 26 of the estimated magnetic pole position calculation unit 15' shifts, by $\pi/2$, the phase of the high-frequency voltage command in the dq coordinate system generated by the voltage command unit 11.

Then, in Step S208, the product calculation unit 22 of the estimated magnetic pole position calculation unit 15' calculates the product of the value of the current in the dq coordinate system calculated by the dq-coordinate transformation unit 14 and the high-frequency voltage command whose phase is shifted by the phase shifting unit 26.

Then, in Step S209, the filtering unit 23 of the estimated magnetic pole position calculation unit 15' removes a high-frequency component from the calculation result obtained by the product calculation unit 22.

Then, in Step S210, the gain unit 24 of the estimated magnetic pole position calculation unit 15' calculates the product of a predetermined gain constant and the signal output by the filtering unit 23 after the removal of the high-frequency component.

Then, in Step S211, the integration unit 25 of the estimated magnetic pole position calculation unit 15' integrates the result output by the gain unit 24, and then outputs the integral as a new estimated magnetic pole position to be used.

Then, in Step S212, the magnetic pole position confirmation unit 16 determines whether or not the estimated magnetic pole position calculated by the estimated magnetic pole position calculation unit 15' substantially converges on a certain position. When it is determined that the estimated magnetic pole position substantially converges on the certain position, the process goes to Step S213 in which the magnetic pole position confirmation unit 16 confirms that this estimated magnetic pole position is the initial magnetic pole position at the time when the synchronous motor 2 is started. As a modified example of this operation, the magnetic pole position confirmation unit 16 may determine whether a predetermined time period has elapsed (Step S212), and, when it is determined that the predetermined time period has elapsed, confirms that the estimated magnetic pole position is the magnetic pole position at the time when the synchronous motor 2 is started (Step S213).

Figure 6:
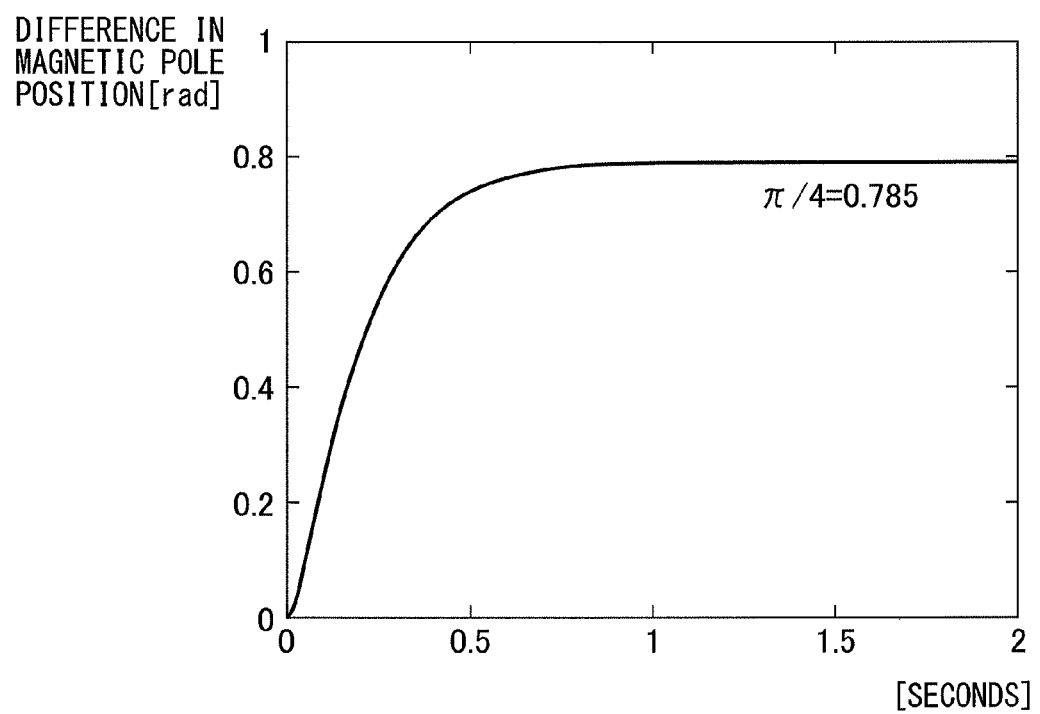
FIG. 6 is a graph presenting a result of an operation simulation of the magnetic pole position detector.
Figure 7A:
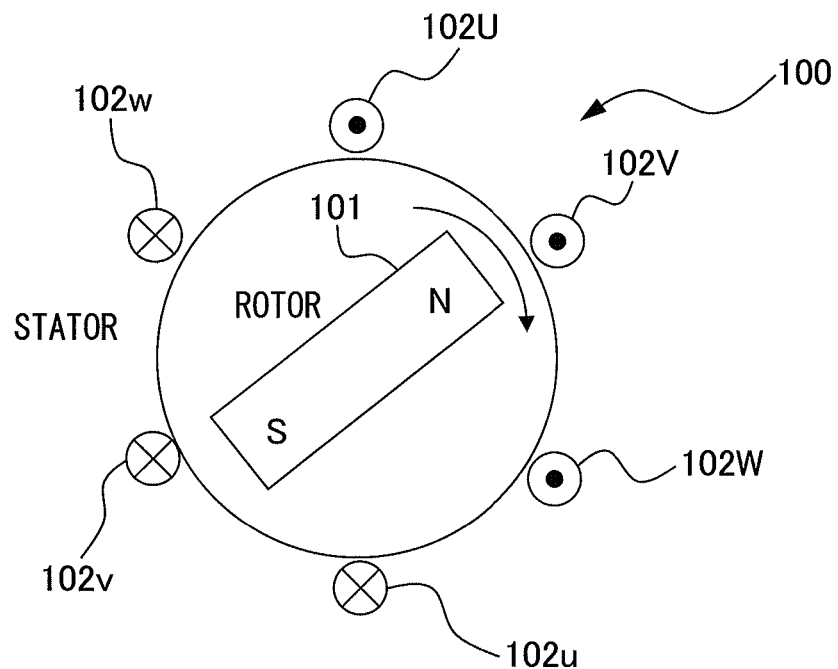
FIG. 7A and FIG. 7B are schematic diagrams illustrating detection of a magnetic pole position of a permanent-magnet synchronous motor.
Figure 7B:
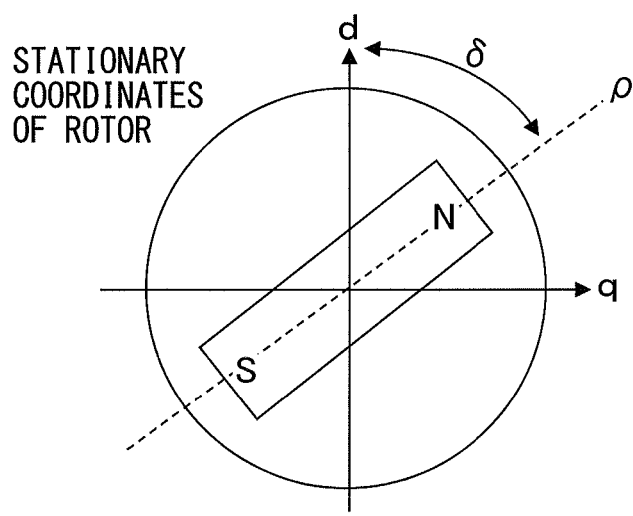

FIG. 6 is a graph illustrating a result of an operation simulation of the magnetic pole position detector. In FIG. 6, the horizontal axis represents time (seconds), and the vertical axis represents "$\rho-\theta$ [rad]", which is the difference between the actual rotor position $\theta$ and the rotor position $\rho$ detected by the sensor 18.

In the simulation, the magnetic pole position detector 1 according to the first embodiment was used. In addition, "$\rho-\theta$" representing the difference between the actual rotor position $\theta$ and the rotor position $\rho$ detected by the sensor 18 was set at $\pi/4$. Under these conditions, it was verified whether the difference $\pi/4$ could be detected by the magnetic pole position detector 1 according to the first embodiment. The following parameters are used in the simulation: 0.4Ω as an internal resistance Ra per phase of the synchronous motor 2; 3.3 mH as a d-axis inductance $L_d$ per phase; 3.3 mH as a q-axis inductance $L_q$ per phase; four as the number of pole pairs; and 0.2431 Vp/rad/s as the counter electromotive voltage constant Kv. In addition, the amplitude of a sinusoidal high-frequency voltage input was set at 1V, and the frequency was set at 500 Hz. The band of the LPF serving as the filtering unit 23 was set at 3 Hz, the gain constant K of the gain unit 24 was set at 100, and the initial value of the estimated magnetic pole position was set at 0 deg.

As can be understood from FIG. 6, "$\rho-\theta$" converges on 0.785, approximately one second after the magnetic pole position detector 1 was caused to operate. Since the value 0.785 is consistent with $\pi/4$ to three decimal places, it is demonstrated that the magnetic pole position detector 1 is capable of detecting "$\rho-\theta$", i.e., the difference between the actual rotor position $\theta$ and the rotor position $\rho$ detected by the sensor 18.

As has been described with the first and second embodiments, the above-described magnetic pole position detector is capable of detecting an initial magnetic pole position of a rotor at the time when a synchronous motor is started. Note that the above-described magnetic pole position detector is capable of detecting an initial magnetic pole position of a rotor, and is not capable of detecting the polarity, i.e., the N-pole or the S-pole, of the rotor at the initial magnetic pole position. For detection of the polarity, a method of feeding a large current to an initial magnetic pole position and then observing magnetic saturation characteristics such as the current-rise time constant at the time when the current is fed, may be employed as in the invention described in Japanese Patent No. 3805336.

The present invention is applicable to detection of a magnetic pole position when a synchronous motor is started.

According to the present invention, provided is a magnetic pole position detector that is capable of detecting, with high accuracy, a magnetic pole position of a synchronous motor having saliency, when the synchronous motor is started, and that is unlikely to be affected by noise.

Moreover, the rotor of the synchronous motor does not need to be rotated for detection of an initial magnetic pole position. Accordingly, unlike Japanese. Patent No. 3408468 and Japanese Laid-open Patent Application Publication No. 2002-136174, an initial magnetic pole position can be detected accurately even when the rotor is locked since detection accuracy of the initial magnetic pole position is not affected by the friction or inertia of the rotor.

Furthermore, general types of rotor structure for a synchronous motor are: a surface magnet type having a permanent magnet attached to the rotor surface; and an embedded magnet type having a permanent magnet embedded in the rotor. The magnetic pole position detector according to the present invention, which uses the saliency of the synchronous motor, is especially advantageous to magnetic pole position detection, for an embedded-magnet-type rotor having high saliency, when the rotor is started. At the same time, even in the case of a surface-magnet-type rotor having low saliency, the magnetic pole position detector is capable of detecting an initial magnetic pole position with high accuracy, by appropriately choosing a gain constant. In addition, detection is unlikely to be affected by noise when employing a method that does not perform differential calculation.

What is claimed is:

1. A magnetic pole position detector for detecting a magnetic pole position when a synchronous motor is started, the magnetic pole position detector comprising:
   a voltage command unit that generates high-frequency voltage command in a dq coordinate system;
   a three-phase coordinate transformation unit that transforms the high-frequency voltage command in the dq coordinate system to high-frequency voltage command in a three-phase coordinate system by using an estimated magnetic pole position;
   a current detection unit that detects three-phase current fed from a power converter to the synchronous motor, the power converter generating drive power for the synchronous motor in accordance with the high-frequency voltage command in the three-phase coordinate system;
   a dq-coordinate transformation unit that transforms the three-phase current detected by the current detection unit to current in the dq coordinate system by using the estimated magnetic pole position used in a transformation by the three-phase coordinate transformation unit;
   an estimated magnetic pole position calculation unit that calculates a new estimated magnetic pole position to be used in a coordinate transformation process by each of the three-phase coordinate transformation unit and the dq-coordinate transformation unit, in accordance with the current in the dq coordinate system and the high-frequency voltage command in the dq coordinate system; and
   a magnetic pole position confirmation unit that confirms that, when a difference between the estimated magnetic pole position calculated by the estimated magnetic pole position calculation unit and an actual magnetic pole position substantially converges on a certain value, the estimated magnetic pole position is the magnetic pole position when the synchronous motor is started,
   wherein the estimated magnetic pole position calculation unit includes:
      a differentiation unit that differentiates a value of the current in the dq coordinate system;
      a product calculation unit that calculates a product of the value of current differentiated by the differentiation unit and the high-frequency voltage command in the dq coordinate system;
      a filtering unit that removes a high-frequency component from the product obtained by the product calculation unit;
      a gain unit that calculates a product of a predetermined gain constant and a signal output by the filtering unit after the removal of the high-frequency component; and
      an intergration unit that integrates the product output from the gain unit and then outputs an integrated result as the new estimated magnetic pole position to be used.

2. The magnetic pole position detector according to claim 1, wherein
   the high-frequency voltage command in the dg coordinate system include a d-phase component that is a high frequency and a q-phase component that has zero amplitude, and
   the estimated magnetic pole position calculation unit calculates the new estimated magnetic pole position to be used, on the basis of a q-phase component of the current in the dg coordinate system and the d-phase component that is a high frequency.

3. A magnetic pole position detector for detecting a magnetic pole position when a synchronous motor is started, the magnetic pole position detector comprising:
   a voltage command unit that generates high-frequency voltage command in a dq coordinate system;
   a three-phase coordinate transformation unit that transforms the high-frequency voltage command in the dq coordinate system to high-frequency voltage command in a three-phase coordinate system by using an estimated magnetic pole position;
   a current detection unit that detects three-phase current fed from a power converter to the synchronous motor, the power converter generating drive power for the synchronous motor in accordance with the high-frequency voltage command in the three-phase coordinate system;
   a dq-coordinate transformation unit that transforms the three-phase current detected by the current detection unit to current in the dq coordinate system by using the estimated magnetic pole position used in a transformation by the three-phase coordinate transformation unit;
   an estimated magnetic pole position calculation unit that calculates a new estimated magnetic pole position to be used in a coordinate transformation process by each of the three-phase coordinate transformation unit and the dq-coordinate transformation unit, in accordance with the current in the dq coordinate system and the high-frequency voltage command in the dq coordinate system; and
   a magnetic pole position confirmation unit that confirms that, when a difference between the estimated magnetic pole position calculated by the estimated magnetic pole position calculation unit and an actual magnetic pole position substantially converges on a certain value, the estimated magnetic pole position is the magnetic pole position when the synchronous motor is started,
   wherein the estimated magnetic pole position calculation unit includes:
      a phase shifting unit that shift a phase of the high-frequency voltage command in the dq coordinate system;
      a product calculation unit that calculates a product of a value of the current in the dq coordinate system and the high-frequency voltage command whose phase is shifted by the phase shifting unit;
      a filtering unit that removes a high-frequency component from the product obtained by the product calculation unit;

a gain unit that calculates a product of a predetermined gain constant and a signal output by the filtering unit after the removal of the high-frequency component; and an integration unit that integrates the product output from the gain unit and then outputs an integrated result as the new estimated magnetic pole position to be used.

* * * * *